United States Patent
Dopf et al.

(10) Patent No.: US 6,572,152 B2
(45) Date of Patent: Jun. 3, 2003

(54) SUBASSEMBLY ELECTRICAL ISOLATION CONNECTOR FOR DRILL ROD

(75) Inventors: Anthony Robert Dopf, Calgary (CA); Paul L. Camwell, Calgary (CA); Michael T. Sutherland, Calgary (CA)

(73) Assignee: Ryan Energy Technologies Inc., Calgary (CA)

( * ) Notice: Subject to any disclaimer, the term of this patent is extended or adjusted under 35 U.S.C. 154(b) by 0 days.

(21) Appl. No.: 09/745,881

(22) Filed: Dec. 21, 2000

(65) Prior Publication Data

US 2002/0113432 A1 Aug. 22, 2002

Related U.S. Application Data

(60) Provisional application No. 60/173,471, filed on Dec. 29, 1999.

(51) Int. Cl.⁷ ................................................. F16L 55/00
(52) U.S. Cl. .......................... 285/48; 285/53; 285/330; 285/332.2; 285/369
(58) Field of Search .............................. 285/47, 48, 53, 285/330, 332.2, 332.3, 369

(56) References Cited

U.S. PATENT DOCUMENTS

| | | | | |
|---|---|---|---|---|
| 2,364,957 A | * | 12/1944 | Douglas | |
| 2,917,704 A | * | 12/1959 | Arps | |
| 3,482,859 A | * | 12/1969 | Bowlin | |
| 3,581,834 A | * | 6/1971 | Kellner | 175/321 |
| 4,186,807 A | | 2/1980 | Sutliff et al. | |
| 4,286,217 A | * | 8/1981 | Planche et al. | 324/347 |
| 4,496,174 A | | 1/1985 | McDonald et al. | |
| 4,684,946 A | | 8/1987 | Issenmann | |
| 5,138,313 A | | 8/1992 | Barrington | |
| 5,163,714 A | | 11/1992 | Issenmann | |
| 5,394,141 A | | 2/1995 | Soulier | |
| 5,467,083 A | | 11/1995 | McDonald et al. | |
| 5,563,512 A | * | 10/1996 | Mumby | 324/339 |
| 6,050,353 A | * | 4/2000 | Logan et al. | 175/320 |
| 6,098,727 A | * | 8/2000 | Ringgenberg et al. | 285/48 |

FOREIGN PATENT DOCUMENTS

CA  2151525  12/1996

* cited by examiner

*Primary Examiner*—Lynne H. Browne
*Assistant Examiner*—James M. Hewitt
(74) *Attorney, Agent, or Firm*—Barnes & Thornburg (57) ABSTRACT

In a subassembly electrical isolation connector for interconnecting sections of a tubular drill rod, the subassembly having an electrically insulated connector for and between spaced-apart connector sections to transmit drilling forces therethrough, the use of a sealing membrane for sealing an insulated spacing in the electrically insulated connector to prevent ingress of pressurized drilling mud into the connector and shorting out said spaced-apart sections of the connector, the sealing membrane overlapping said connector sections as a continuous sleeve and having at least its sleeve ends sealed to respective portions of the connector sections to thereby activate the sealing membrane.

9 Claims, 7 Drawing Sheets

SUBASSEMBLY ELECTRICAL ISOLATION CONNECTOR FOR DRILL ROD

RELATED APPLICATION

This application is the non-provisional filing of provisional application no. 60/173,471 filing date Dec. 29, 1999.

FIELD OF THE INVENTION

This invention relates to a subassembly electrical isolation connector for interconnecting adjacent tubular drill rods of a drilling system used in drilling bore holes in earth formations. More particularly, improvements are provided in such connector systems for enhancing the sealing system and for increasing the interior diameter of the subassembly connector.

BACKGROUND OF THE INVENTION

There is a continuing demand to enhance the functioning of the electrical components and mechanical components associated with the transmission of electromagnetic signals from a location at great depths in the earth to the earth's surface. Such communication is used in various types of drilling operations, such as measuring while drilling (MWD) and/or logging while drilling (LWD). Other situations, which warrant communication with the earth surface, is during the inspection and evaluation of bore holes. Such communication is particularly important when carrying out directional drilling such as under river beds, subways, unusual earth formations and tapping oil reservoirs. It is important at all times to know precisely the location of the drill bit. A significant effort has been made to develop electrical instruments which are capable of transmitting signals at the drill face or inspection face back to the earth's surface. Some systems involve the use of the lower portion of the drill string as an antenna for purposes of transmitting via electromagnetic waves, information to the earth's surface, such as described in U.S. Pat. No. 5,394,141. Such system does not involve the use of an isolation subassembly in the drill string.

Various types of devices which are mounted on the outside of the drill string for monitoring surrounding conditions and/or used in communication are described, for example, in U.S. Pat. No. 4,684,946 to Geoservices and U.S. Pat. No. 5,467,832 to Schlumberger Technology Corporation. The problem with mounting communication devices and sensing devices on the exterior of the drill string is that, particularly with directional drilling, the exterior devices are damaged by striking the formations about the bore hole.

In order to enhance communication with the earth's surface, it is preferred to electrically isolate drill string components so that electromagnetic signals can be developed for data telemetry. This is achieved by a subassembly connector which electrically isolates adjacent drill string components so that the isolated components provide the two terminals of an antenna to which an alternating current is applied in developing the electromagnetic signal for transmission to the earth's surface. Examples of such connectors are described in U.S. Pat. No. 5,138,313 to Haliburton Company; U.S. Pat. No. 5,163,714 to Geoservice and Canadian patent application 2,151,525 to McAllister Petroleum Services, Ltd. The various types of subassemblies provide for electrical isolation which are particularly useful in bore hole inspection, but may be subject to failure when used, for example, in directional drilling. It has been found that the drill string, and in particular the subassembly connector, is subjected to extreme torsion compression, tension, and bending moments during directional drilling. Such extreme forces can result in connector failure, usually at the weakest point in the subassembly. The connectors of these patents and patent application may fail due to overstressing and possibly break up at their weakest point. The connectors may even fail to the extent, particularly those of the U.S. patents, that retrieval of the drill bit and other components below the subassembly cannot be achieved.

Various types of outer sleeves are provided for subassembly connections such as described in the aforementioned U.S. Pat. No. 5,138,313. The outer sleeve is a machined component which is threaded to other components of the subassembly to provide an outer member. In order to transmit the torque through the connector, a hexagonal gap block is provided.

Other sleeve arrangements are described in U.S. Pat. Nos. 4,186,807; 4,496,174 and 5,163,714. The arrangement of U.S. Pat. No. 4,186,807 has an outer sleeve which is threaded onto the balance of the components to form a complete structure. U.S. Pat. No. 4,496,174 correspondingly discloses an outer sleeve which forms part of the structure and is clamped and sealed in place. The torque transmitting of the interengaged sleeves is provided by either a serpentine connection or a lug type connection. U.S. Pat. No. 5,163,714 describes an outer sleeve seal system with interconnected coupling sections.

In accordance with an object of an aspect of this invention, a subassembly electrical isolation connector is provided which has an improved seal mechanism and torque transfer devices which provide for increased interior diameter of the passageway through the connector.

SUMMARY OF THE INVENTION

In accordance with an aspect of the invention, a subassembly electrical isolation connector for interconnecting adjacent tubular drill rods of a drilling system used in drilling bore holes in earth formations electrically isolates the interconnected drill rods. The connector comprises a sealing membrane for sealing the insulated gap between a first connector and a second connector of the subassembly. The sealing membrane preferably is in the shape of a sleeve overlapping the insulated gap between the connectors with at least its respective ends secured to the respective connector to energize the seal, such that the pressure of the drilling mud ensures seal integrity.

In accordance with another aspect of the invention, in a subassembly electrical isolation connector for interconnecting sections of a tubular drill rod, the subassembly has an electrically insulated connector for and between spaced-apart connector sections to transmit drilling forces therethrough, the use of a sealing membrane for sealing an insulated spacing in electrically insulated connector to prevent ingress of pressurized drilling mud into the connector and shorting out the spaced apart sections of the connector, the sealing membrane overlapping the connector sections as a continuous sleeve and having at least its sleeve ends sealed to respective portions of the connector sections to activate thereby the sealing membrane.

In accordance with a further aspect of the invention, in a sub assembly electrical isolation connector for interconnecting sections for a tubular drill rod, an electrically insulated connector for and between spaced-apart connector sections, the connector comprises spaced-apart interfitting components provided on the spaced-apart connector sections and electrically insulating force transmitting components provided between and determining spacing of the spaced apart sections, electrically insulating force transmitting components provided between and determining spacing between the spaced-apart sections, and an electrically insulative material injected into a space defined between the spaced-apart sections.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
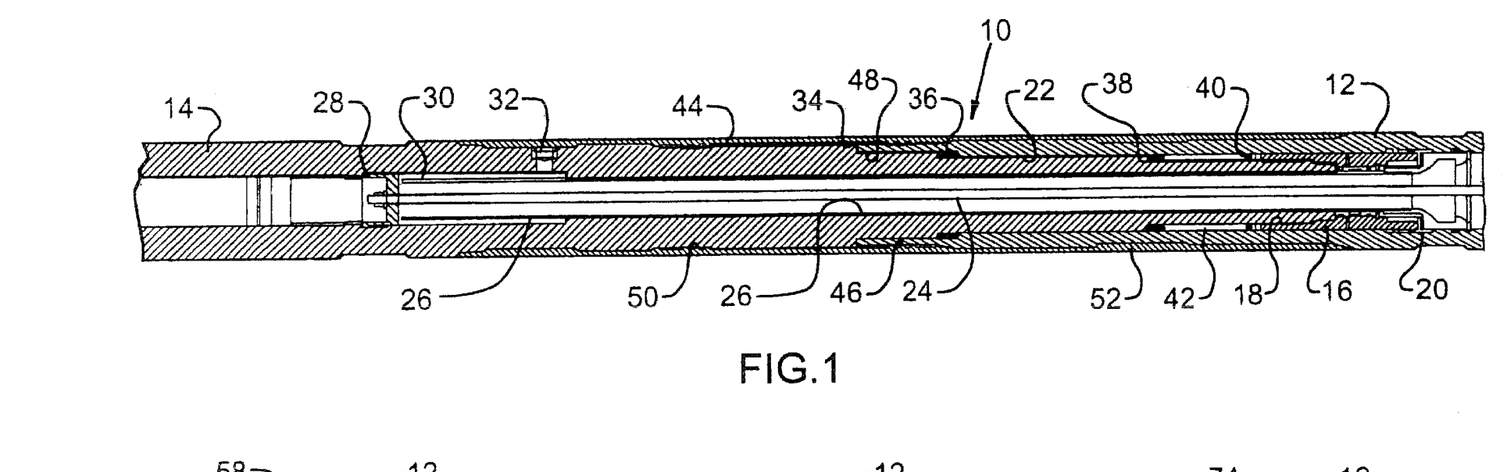
FIG. 1 is a longitudinal section of an insulated subassembly having overlapping connector portions.

As described in applicant's U.S. Pat. No. 6,060,353 and copending U.S. application Ser. No. 09/240,140 filed Jan. 29, 1999, now U.S Pat. No. 6,158,532 various types of overlapping subassembly connection systems are described and which are insulated so that they may be used in signal transmission. Although these systems function very well in most environments, there are circumstances which require better sealing mechanisms and which provide for larger internal diameters through the subassembly to increase drilling mud flow. A sealing system, in accordance with this invention, has been developed which withstands extreme conditions and which provide for enlarged internal diameters of the subassembly. With reference to FIG. 1, a subassembly 10 is shown having a housing 12 as the first connector and mandrel 14 as the second connector of a subassembly. As is appreciated, the first connector 12 is connected to an upper drill string and connector 14 is connected to a lower drill string. In accordance with this particular embodiment, the first connector 12 is connected to the second connector 14 by the use of a nut 16 which is threaded onto the second connector by mating threads 18. The nut is threaded in place by engaging internal hex head 20. A gap 22 is defined between the first connector 12 and the second connector 14 in the region in which they overlap. This area is injected with a suitable insulative material to ensure that the components do not contact during use and short out, thereby impairing the operation of the antenna 24 which extends through a wash tube 26. The insulative material is preferably an adhesive which enhances the structural integrity of the subassembly connectors 12 and 14. At the distal end of the wash tube 26 is a floatable seal 28 where oil is inserted in chamber 30 through oil fill plug 32.

In order to achieve alignment of the first connector 12 with the second connector 14, suitable alignment shoulders 34 and 36 are provided which work in conjunction with additional alignment shoulders 38 and 40. A suitable torque transmitting device, which is electrically non-conductive, is provided between first connector 12 and second connector 14 in the annular region 42. Possible configurations for the torque transmitting devices are shown in more detail in FIGS. 2A through 2C.

Figure 3:
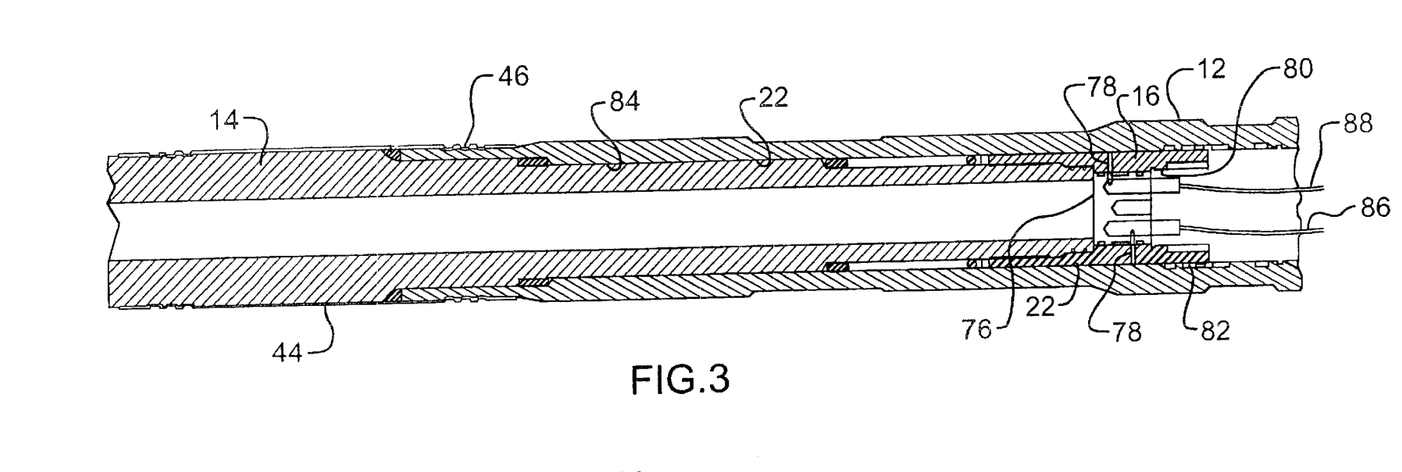
FIG. 3 is a longitudinal section of the subassembly of FIG. 1, partly assembled and showing the injection of insulative material into the space between the overlapping first and second connectors.

The gap at alignment shoulder 34 between the first connector 12 and the second connector 14 is sealed, in accordance with this invention, by a sleeve 44 which is shown in more detail in FIG. 3. The sleeve 44 may be more generally referred to as a sealing membrane. The sleeve 44 is preferably of a durable waterproof polymeric material such as rubber, the sleeve fits over the open portion and alignment shoulder 34 to ensure that pressurized mud on the exterior of the subassembly does not permeate past shoulder 34 and underneath first connector 12 to thereby short out the insulated gap between first connector 12 and second connector 14. The sleeve is of a sufficient length to at least cover the inner connection at 34. The sleeve is secured to the respective connector ends to energize the seal. In accordance with this particular embodiment, this is accomplished by the use of wire 46 or the like, which are wrapped about the end 48 of the first connector 12 to secure the sleeve to the first connector. Wire 50 is used in a similar manner to connect the other end of the sleeve to the second connector 14. Placed over the seal is a customary outer composite coating 52 which protects the seal by resisting abrasion and the like in the region of the seal due to the turning of the subassembly in a drill hole. Further details of the composite coating are described, for example, in applicant's U.S. Pat. No. 6,050,353, the subject matter of which is hereby incorporated by reference. It is appreciated that the composite coating 52, which may be of a specialized setting polymeric material and high tensile cord, can develop microcracks which allow pressurized mud to permeate the composite coating 52. The presence of the high pressure mud can the find its way to the sleeve 44 and apply exterior pressure to the seal. However, due to the energization of the seal, extra pressure on the outside of the sleeve only increases the sealing capacity of the sleeve to prevent any further ingress of drilling mud between the first connector 12 and the second connector 14. Additional pressure from the drilling mud greatly enhances the effectiveness of the sleeve seal.

Figure 2A:
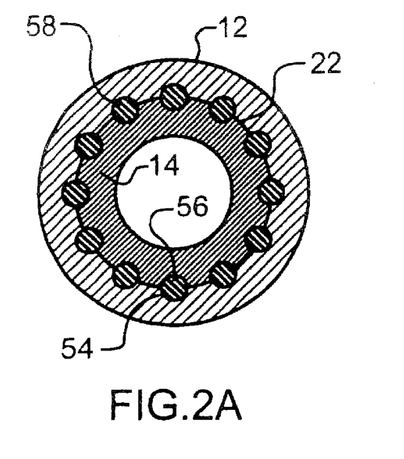
FIGS. 2A, 2B and 2C are sections through the torque transfer device of FIG. 1.
Figure 2B:
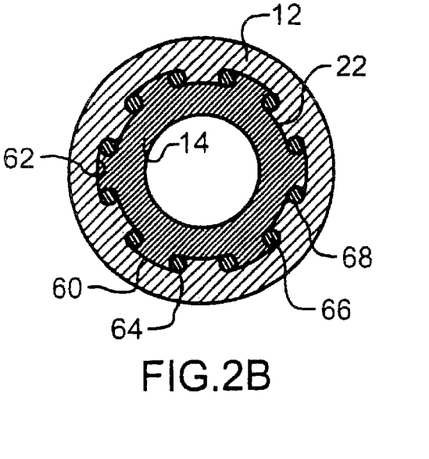
Figure 2C:
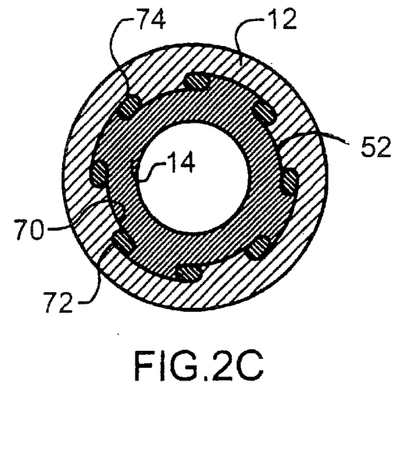

To transfer the torque from the first connector 12 to the second connector 14 and hence through the drill string, various alternatives are suggested in FIGS. 2A through 2C. All these particular embodiments may generally be referred to as spline arrangements. In FIG. 2A, the first connector 12 overlaps the second connector 14. The space 22 is defined between the first and second connectors which is filled with insulated material in a manner to be discussed with respect to FIG. 3. In the region 42 of FIG. 1, the first and second connectors 12 and 14 are provided with a plurality of mating recesses 54 and 56 which, when aligned, define longitudinally extending circular bores. Circular pins 58 are provided in these longitudinally standing bores which are electrically non-conductive or electrically insulative and have sufficient structural integrity to resist the shear forces applied on connector 14 by connector 12 in rotating the drill string. Suitable pins for placement in the bores may be made of high tensile polymeric materials and most preferably ceramic materials.

An alternative embodiment is shown in FIG. 2B for interconnecting the first connector 12 to the second connector 14. The space 22 is defined between the connectors. The first connector 12 has a series of longitudinally extending channels 60 formed therein and the connector 14 has correspondingly mated lugs 62 provided thereon. At the fitment between the lugs and grooves, longitudinally extending bores 64 are provided in which circular pins 66 are placed. The pins may be of the same material as referenced in FIG. 2A, such as high tensile polymeric materials in ceramics. The pins are placed in compression and should they fail, the lug portion 62 of the second connector interfere with the recess edges 68 to ensure that the drill string continues to rotate.

The alternative embodiment shown in FIG. 2C has the first connector 12 engaging a series of lugs 70 on the second connector 14 within recesses 72 of the first connector 12. The circumferentially arranged lugs 70 extend axially less than the recesses 72. The spaces are filled with rectangular-shaped torque transfer pins 74. These are, as well, placed in compression and should they fail, the lugs 70 still engage the edges of the recesses 72 to transfer the torque from the first connector 12 to the second connector 14.

The insulative space 22 between the first connector 12 and the second connector 14 is referenced in FIG. 3. An injection device 76 is provided within the nut 16 which secures the first connector 12 to the second connector 14. The nut 16 includes a plurality of passageways 78 which extend from the interior 80 of the nut and are in communication with the space 22 on the outside of the nut. That space 22 extends from the seals 82 at the rear portion of the nut all the way along the inside diameter 84 of the first connector member to the alignment shoulder 34. This space 22 is injected with an insulative material which is preferably an adhesive to ensure that the first connector member 12 is not in electrical contact with the second connector member 14. The injection device 76 is provided with a first line 86 and a second line 88. Insulative materials, such as non-electrically conductive epoxy material, is injected through line 86 and a vacuum is drawn in line 88. The polymeric material enters the device 76 and passes through channel 78 into the space 22. The vacuum drawn in line 88 encourages the polymeric material to fill the space 22 completely to maintain a space between the first connector 12 and the second connector 14 and thereby electrically isolate them. When the injection of the polymeric material is complete, injection device 76 is withdrawn and the wash tube with antenna is completed as shown in FIG. 1.

The assembly procedure for the subassembly of FIG. 1 is conducted sequentially to ensure proper alignment and fitment of the components. The alignment shoulders and keys are all made of a high strength non-conductive material. Alignment shoulders 34 and 36 are rings and may be slid onto the first connector or mandrel 12. Alignment shoulder 38 is a split ring in two halves so that it can be installed into a groove adjacent to the splines 42. Preferably at this juncture, the splines are recesses in the first connector 12 and are fitted with the keys. The housing is then slid over the mandrel and is positioned axially and diametrically by the alignment shoulders 34, 36 and 38. Alignment shoulder 40, at the other end of the spline and inserted keys, is then placed in position. The straight nut 16 is then inserted into the first connector 12 and then threaded onto the second connector 14. The straight nut 16 bottoms out simultaneously on the second connector 14 and the alignment shoulder 40. The housing is now held in correct alignment between the first connector 14 and the straight nut 16 with the use of the alignment shoulder.

The isolation gap 22, that now exists between the inside diameter of the first connector 12, the outside diameter of the second connector 14 and the straight nut 16, provides an insulative space. An O-ring may be used at alignment shoulder 34 to seal this side of the gap for purposes of epoxy injection. A second O-ring may be used at the end of the straight nut 16 to also seal for purposes of epoxy injection. As described with respect to FIG. 3, the epoxy device 76 is placed within the straight nut. Vacuum is applied in the injection of the epoxy until epoxy begins to flow back through the vacuum tubing 88. At that juncture, the valve controlling vacuum in line 88 is shut off. Epoxy is continued to be injected under pressure, usually in the range of 50 psi, to ensure maximum fill in minimizing any trapped air pockets in the isolation gap 22. The epoxy is then left to cure under pressure. Once the epoxy has cured, the injection device 76 is removed and the assembly completed with the wash pipe and antenna, including injection of the silicone oil or other non-conductive fluid to provide for a suitable seal at 28. This seal may be of the movable type as described with respect to applicant's aforementioned U.S. patent application Ser. No. 09/240,140 filed Jan. 29, 1999, now U.S. Pat. No. 6,158,532.

The elastomer sleeve 44 is then stretched over the first connector or second connector ends and secured in place with circumferential windings 46 and 50, as discussed with respect to FIG. 1. Such windings act to energize the seal. Alternatively, a polymer sleeve of a larger diameter may be brought over either end and heat shrunk in place. Circumferential winding may then optionally be used to energize the seal. A further alternative to the seal is to provide compression molding of suitable elastic material about the exterior insulated juncture of the first and second connectors. Compression molding has the advantage of not requiring circumferential windings or other forms of seal energization. The compression molding ensures that the sleeve of resultant material is prestressed such that when pressure of any drilling mud enters the surrounding area, the pressure on the seal increases its sealing effectiveness.

The subassembly is then coated with a protective non-conductive composite material 52. This material serves to provide an insulated length on the outside diameter of the subassembly; that is, approximately 1 meter or more, and also serves to protect the sealing sleeve from damage during drilling, as caused by the casing, open hole formation, cuttings, drilling fluid, erosion and the like. The use of the elastomeric/polymer sleeve, or any other type of sealing sleeve, eliminates the requirement for ceramic coating as described in applicant's previous U.S. patent application Ser. No. 09/240,140 filed Jan. 29, 1999.

Figure 4:
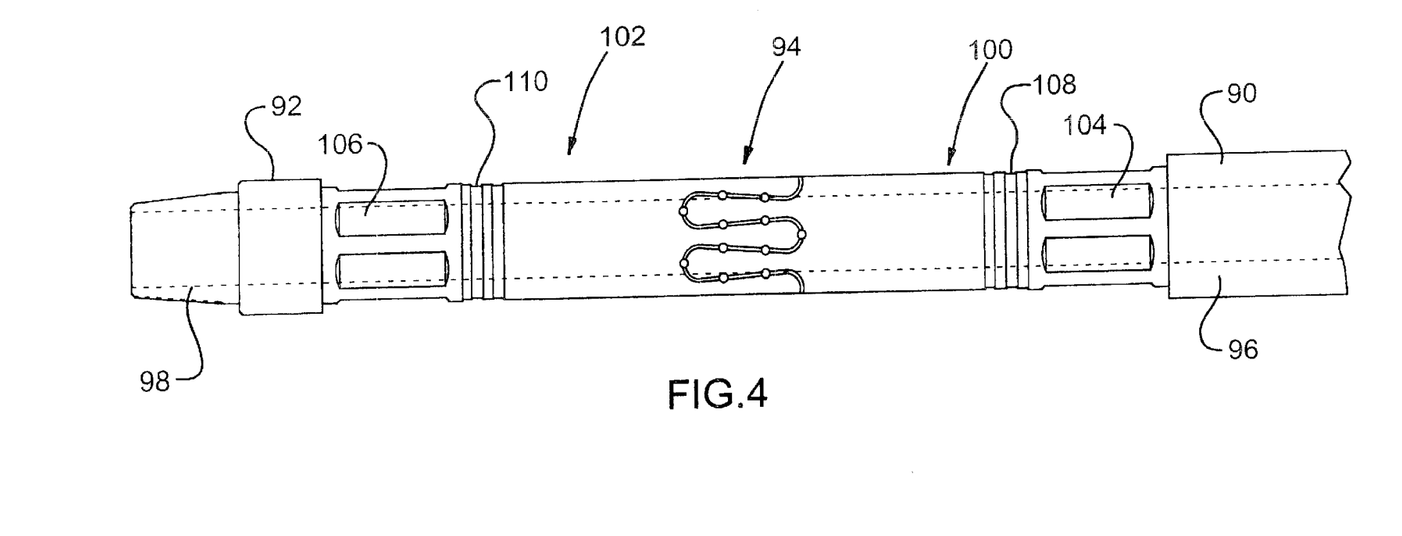
FIG. 4 is a side plan view of an alternative arrangement for the interconnected insulated subassembly.
Figure 5:
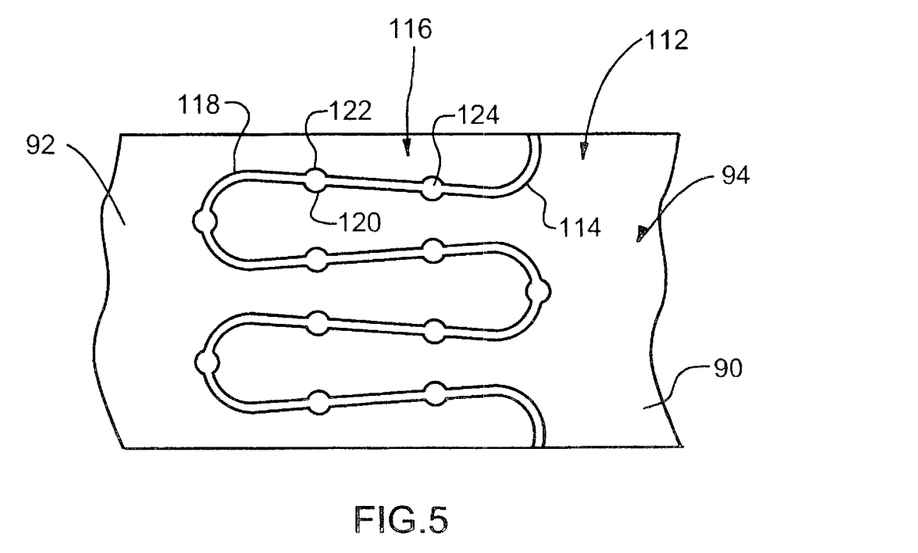
FIG. 5 is an enlarged view of the connection gap between the first and second connectors.
Figure 6:
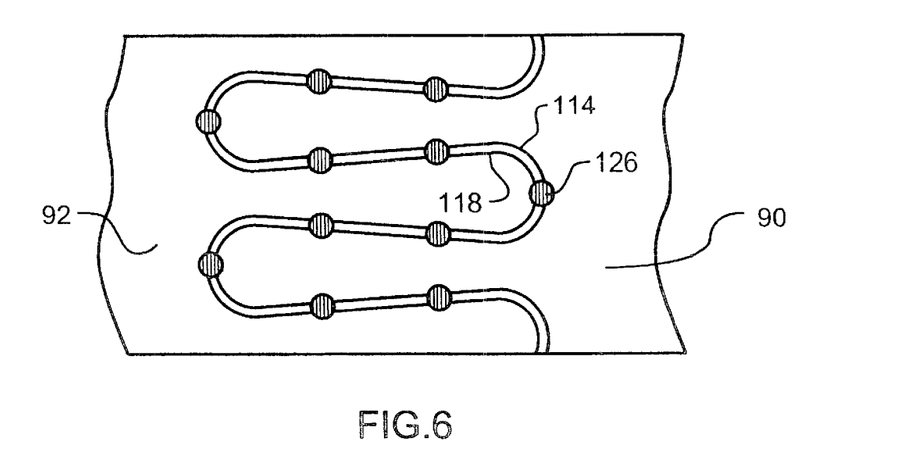
FIG. 6 is an enlarged view of ceramic spacers positioned between the spaced-apart first and second connectors.
Figures 7A, 7B:
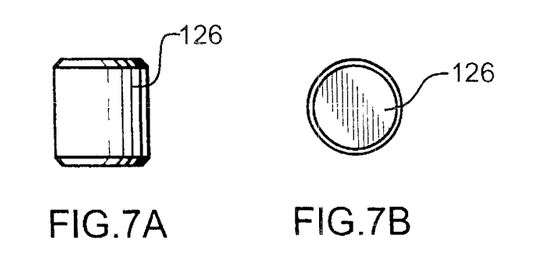
FIGS. 7A and 7B are side views and top views of a ceramic spacer.
Figure 8:
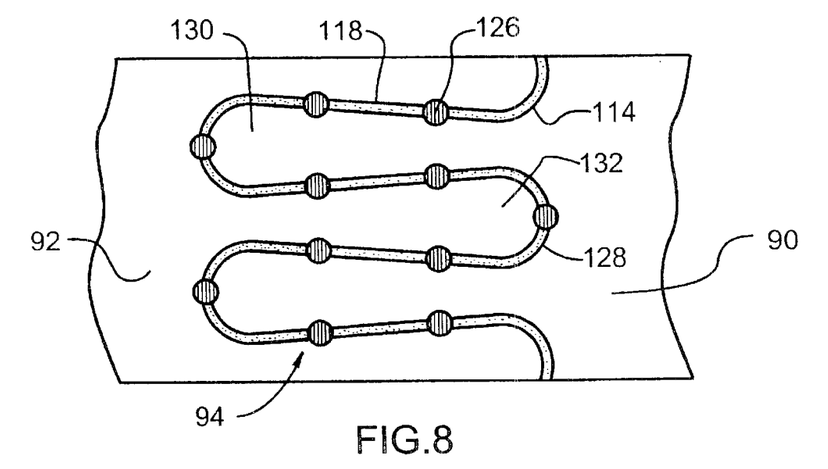
FIG. 8 is an enlarged view of the gap between the first and second connectors filled with insulating material.

Turning to FIG. 4, an alternative arrangement to the spline type of system is provided for transmitting torque from a first connector 90 to a second connector 92 through a serpentine-like interconnection 94. This serpentine connection provides a plurality of interdigitated fingers. The first and second connectors 90 and 92 have end portions 96 and 98, respectively, for connection to the respective upper and lower drill strings. Their intermediate portions 100 and 102 have machined surfaces to provide flats 104 and 106 which interact with the composite wrap to prevent rotation thereof and which is discussed in more detail with respect to FIG. 13. Annular grooves 108 and 110 are included which provide locators for the wire connection of the sealing sleeve to the first and second connectors. The serpentine connection 94 is shown in more detail in FIG. 5. The first connector 90 has machined in its end portion 112 a serpentine-shaped edge 114. Correspondingly, connector 92 has machined in its end portion 116 a mating serpentine edge 118. Along the serpentine-shaped edges 114 and 118 are opposing recesses 120 and 122 which define bores 124 extending through the wall portions of the first and second connectors. Preferably, these bores 124 extend radially through the respective wall portions. To complete the interconnection of the first connector 90 to the second connector 92, ceramic spacers or buttons 126 are located in the bores 124 to eliminate any play between the spaced apart edges 114 and 118 of the respective connectors. The ceramic spacers are shown in more detail in FIGS. 7A and 7B. As shown in these views, the ceramic spacers 126 are cylindrical and have a length equivalent to the wall thickness of the respective connectors 90 and 92. As will be discussed in more detail with respect to FIG. 13, the space between the edges 114 and 118 of the connectors 90 and 92 is filled with an insulating epoxy material 128. Such material is injected into this space between edges 114 and 118 and as well, along the length of the inner sleeve, to be discussed in more detail with respect to FIG. 13. The resulting completed connection, as shown in FIG. 8, thus comprises spaced apart interlocking tongues 130 for the first connector and 132 for the second connector, where the defined space between the tongues is maintained by the ceramic spacers 126 and the injected set polymeric material, such as epoxy 128. This provides a very secure connection which cannot be pulled apart axially and, providing its radial movement is constrained, such as by an inner and/or outer keeper sleeve, readily transmits torque from the first connector to the second connector.

Figure 9A:
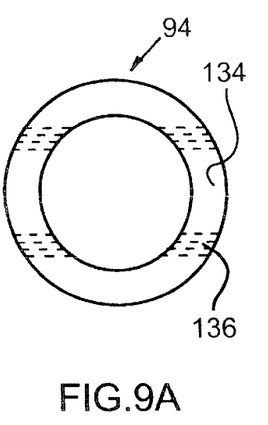
FIG. 9A is a section through and FIG. 9B is a side view of a first embodiment for the first and second connector coupling.
Figure 9B:
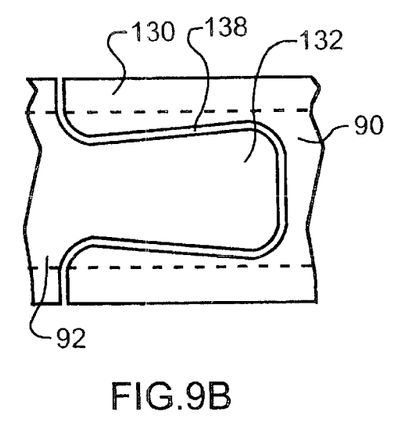

It is appreciated that the serpentine connection 94 may be incorporated in the first and second connectors in various ways. In this respect, attention is directed to FIGS. 9 through 12 which exemplify four different types of couplings. With reference to FIG. 9A, the serpentine connection is cut transversely along the wall 134 which, when completed, defines the first and second connectors. The transverse cuts are shown by dotted lines 136 which may be machined by various techniques, such as milling, laser cutting, high pressure water stream cutting and the like. The transverse cutout is shown in FIG. 9B where interlocking tongues 130 and 132 are provided for connectors 90 and 92. The connection may be unlocked by simply sliding connector 90 laterally relative to connector 92. It is appreciated that the gap 138 provided by the machined cutting has the bores provided therein to accommodate the ceramic spacers and, as well, is injected with epoxy to complete the connection.

Figure 10A:
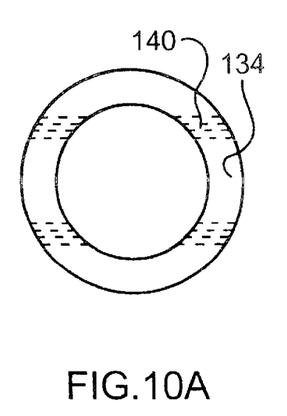
FIG. 10A is a section and FIG. 10B is a side view of the second connector coupling.
Figure 10B:
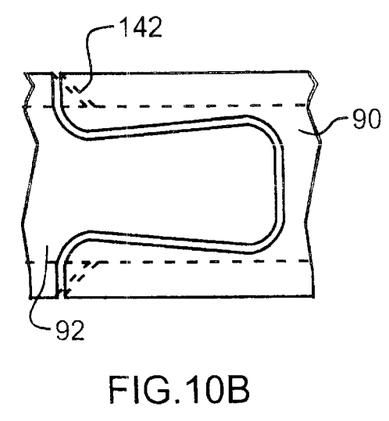

With reference to FIG. 10A, the subassembly wall 134 is cut transversely as shown by dotted lines 140. Only the cut is done on the bias as shown by dotted line 142 in FIG. 10B. The bias cut prevents uncoupling by simply moving the connectors 90 and 92 laterally of one another. However, the connectors can be uncoupled by rotating one relative to the other so that the couplings spiral apart. Again, as will be discussed with respect to FIG. 13, an inner sleeve and/or an outer sleeve is used to complete the coupling. The advantages of a bias cut are twofold. When the subassembly flexes, the bias cut helps reduce relative movement between the interlocking profiles. When the gap has the ceramic spacers included in a manner similar to that described with respect to FIG. 8, and the epoxy material is injected in the gap, the resistance to tension compression and torque is dependent on the mechanical properties of the material between the interlocking profiles. The stress between the interlocking profiles will be reduced at the interconnection, as determined by the ceramic spacers, by increasing the surface area of the joint interfaces. This is readily accomplished by machining the cuts with an angular bias in the manner shown in FIG. 10.

Figure 11A:
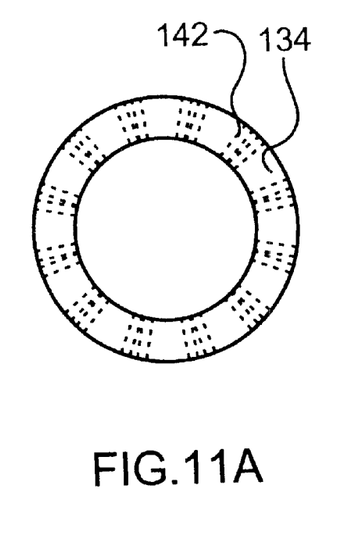
FIG. 11A is a section and FIG. 11B is a side view of the second connector coupling.
Figure 11B:
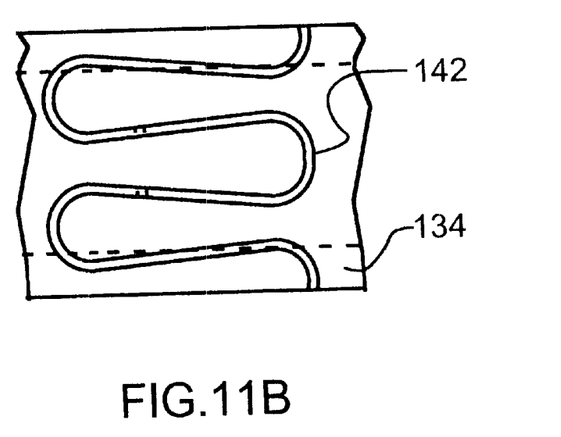
Figure 12A:
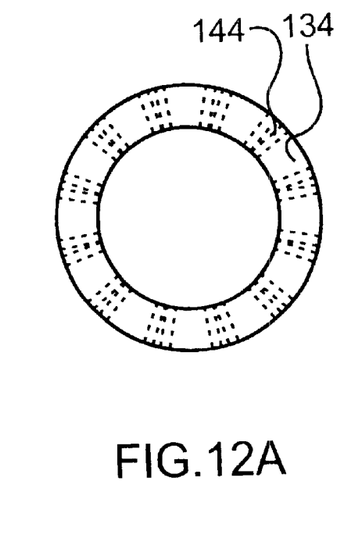
FIG. 12A is a section and FIG. 12B is a side view of the second connector coupling.
Figure 12B:
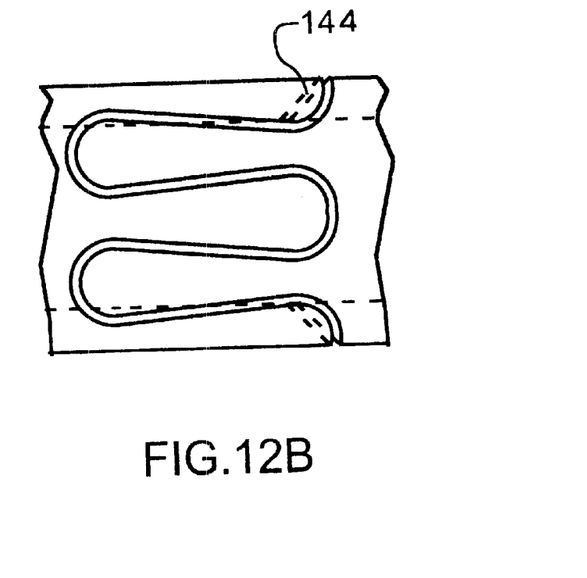

With respect to radially directed cutting of the profile, a permanent connection is provided, where completing the connection is achieved with the use of inner and/outer sleeves. As shown in FIG. 11A, the tube wall 134 is cut radially as indicated by dotted lines 142. The usual bores are placed in the cutout to accommodate the ceramic spacers. The radially directed cuts 142 may also be cut on a bias 144, as shown in FIG. 12B. The bias cuts extend radially through the tube wall 134 as shown in FIG. 12A. The benefit of the bias cut for the radially extending machined cutout 144 is the same as that with respect to FIG. 10; namely, reduction of movement and increase in strength.

Figure 13:
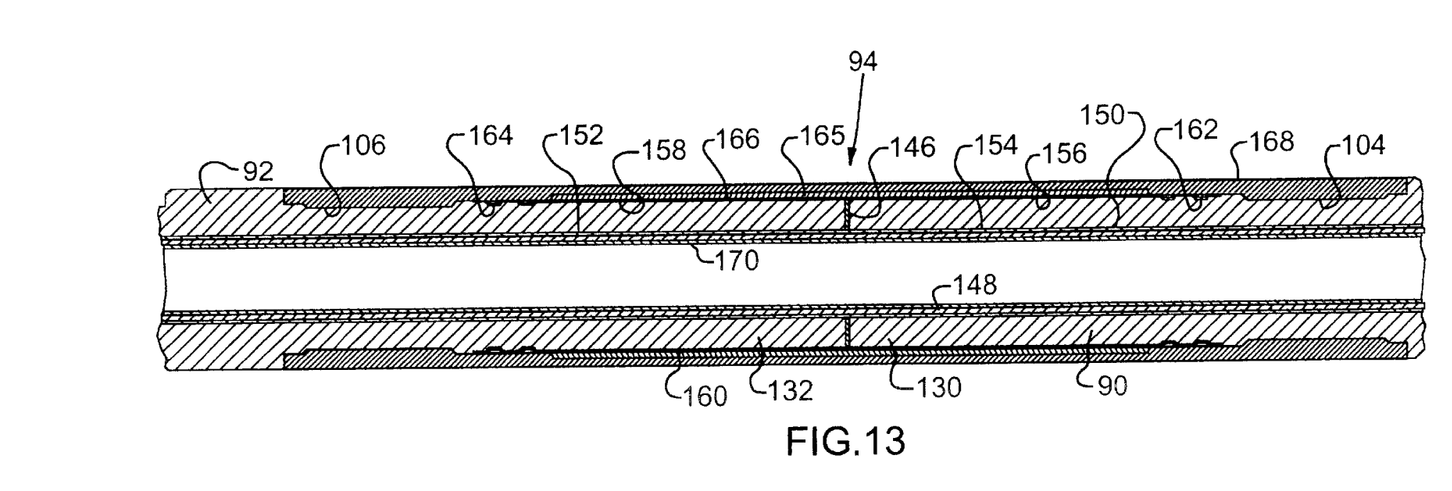
FIG. 13 is a section through the sealing system of the insulated gap of FIG. 4.
Figure 14:
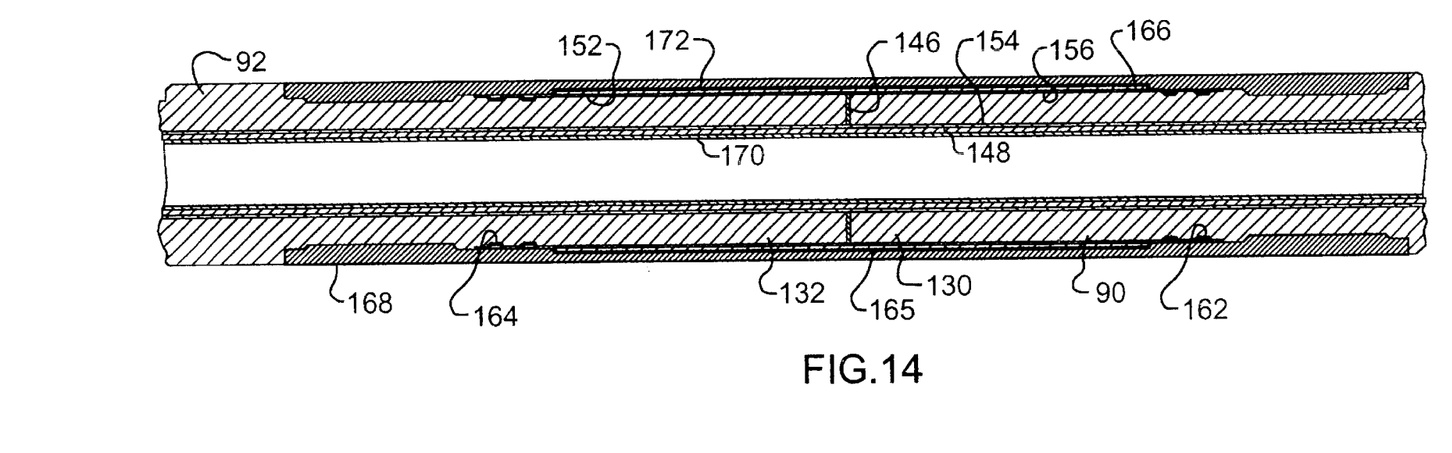
FIG. 14 is an alternative embodiment for the seal for the insulated gap.
Figure 15:
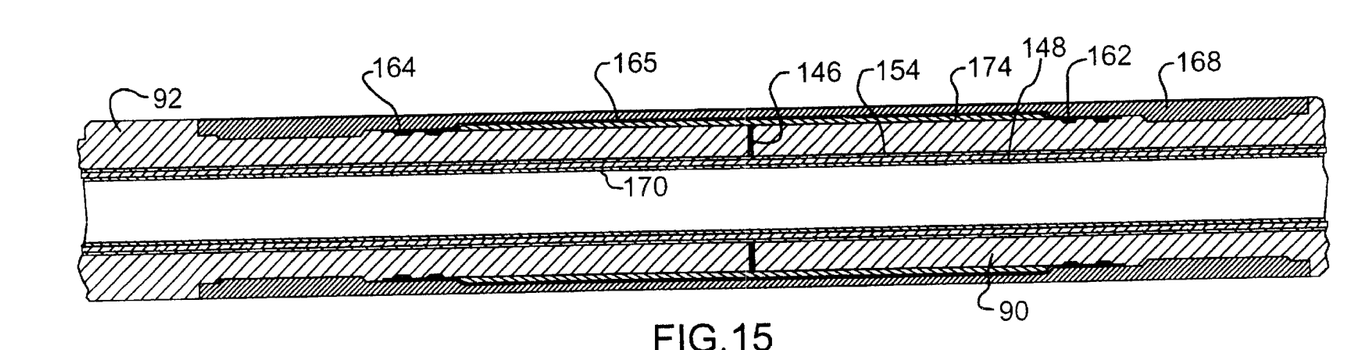
FIG. 15 is another alternative embodiment for the seal of the insulated gap.

Various embodiments for the completed connections are shown in FIGS. 13, 14 and 15. The functioning of the interlocking isolation subassembly is a sum of discrete insulating and mechanical components forming a system to provide electrical isolation and the necessary structural rigidity for the drilling process. These features are achieved by the interconnection and seal as demonstrated in FIGS. 13 through 15. As well the interior space for the drilling mud may be increased and/or the thickness of the exterior composite wrap may be increased. With reference to the section of FIG. 13, the first connector 90 is interconnected to the second connector 92. The gap 146 at the serpentine connection 94 is shown which may be the gap 138, 142 or 144 of the various embodiments between interlocking tongues 130 and 132. As previously discussed, to secure the interlocking of the inter-digitated fingers 130 and 132, an internal non-magnetic keeper sleeve of structural material, such as metal, is provided at 148. The sleeve extends along the respective interior surfaces 150 and 152 of the first and second connectors 90 and 92. Between the sleeve 148 and the interior surfaces 150 and 152 is a small gap 154 which is filled with the epoxy by injection through the gap 146 at the serpentine connection 94. The sleeve is assembled within the interconnected connectors 90 and 92 and sealed at its respective ends. A vacuum may then be drawn through gap 146 and an injector system, located about the outer periphery 156 and 158 of the respective connectors, to permit injection of the insulated material in the gaps 146 and 154. As with the system of FIG. 3, a suitable vacuum is drawn and once epoxy shows up in the vacuum line, the vacuum is shut off and the epoxy is then pressurized to about 50 psi and set to complete the interconnection. By virtue of the injected epoxy material, the inner sleeve 148 becomes a structural member of the subassembly transferring torque from the first connector 90 to the second connector 92 in addition to that transferred by the ceramic spacers.

The exposed gap 146 is then sealed with a suitable sealing membrane 160, which is a polymeric sleeve or the like placed over the completed connection, followed by their respective ends wire wrapped at 162 and 164. This is done to energize the seal should any pressurized drilling mud find its way through the composite wrap. In accordance with a preferred embodiment, an outer non-magnetic, metallic keeper sleeve 166 is provided to reinforce the connection and prevent any lateral movement at the serpentine interconnection 94. A composite wrap 168 is then provided over the entire assembly to provide the necessary resistance to wear and final sealing of the assembly. As discussed with respect to FIG. 4, the flats 104 ensure that the composite wrap 168 does not rotate relative to the first and second connectors 90 and 92. The use of an outer non-magnetic, metallic sleeve 166 is preferable but not essential to the arrangement. It is appreciated that the outer sleeve 166 could be used in place of the inner sleeve 148 to provide yet another alternative to that structure. Regardless of whether there is an inner sleeve 148, the customary wash pipe 170 is provided on the interior of the subassembly to contain and direct the flow of the drilling mud. Its ends are sealed in the customary manner and the antennae extend through the space. The connector 90 is isolated from the connector 92. In the event that the inner sleeve 148 is of a conductive non-magnetic material, the injected epoxy in the space 154 insulates the inner sleeve from the tube connectors. Similarly, the outer sleeve 166, as it encompasses the sealing membrane 165 is insulated from the tube connectors.

An alternative arrangement for the connectors 90 and 92 is shown in FIG. 14. The gaps 146 and 154 are filled with injected epoxy comprising of the usual inner sleeve 148 and inner wash pipe 170. In this arrangement, the outer sleeve 166 is provided over the exterior surfaces 156 and 158 of the first and second connectors. The gap 172 between the outer sleeve 166 and the outer surfaces of the connector is also filled with insulative epoxy material to prevent the sleeve 166 from electrically shorting out connectors 90 and 92. The sealing membrane 165 is then placed over the sleeve 166 and energized by wire wraps 162 and 164. To complete the connection, the usual composite wrap is provided. This arrangement provides additional structure adjacent to the connector tongues 130 and 132 to secure the connection.

In respect to the embodiments of FIGS. 13 and 14, where the outer sleeve 166 is applied to the connection, it is understood that the outer sleeve has to be applied over the connection, because the connection cannot be disassembled. If it is disassembled, it cannot be reconnected with the sleeve in place. Unless of course the recessed area beyond the connection space 146 to either side, thereof, is longer than the length of the sleeve. It is therefore understood that a split sleeve may be located about the connection. By extending the sleeve outwardly, it may be snapped over the connection where the integrity of the sleeve is completed by the outer composite wrap 168. Alternately, the sleeve 148 may be the only sleeve and the outer sleeve 166 eliminated. The rubber sleeve 165 remains in place over which the composite wrap is applied.

With respect to the alternative assembly of FIG. 15, the usual gap 146 is filled with epoxy as is the gap 154 between the inner sleeve 148 and the interior surfaces of connectors 90 and 92. The usual wash pipe is also in place. The outer portion of the connection may be wrapped in a composite wrap 174 which completes the connection. The thinner composite wrap is then sealed with the sealing membrane 165 and wire wrapped at 162 and 164. To complete the connection, additional composite wrap 168 is provided.

Figure 16:
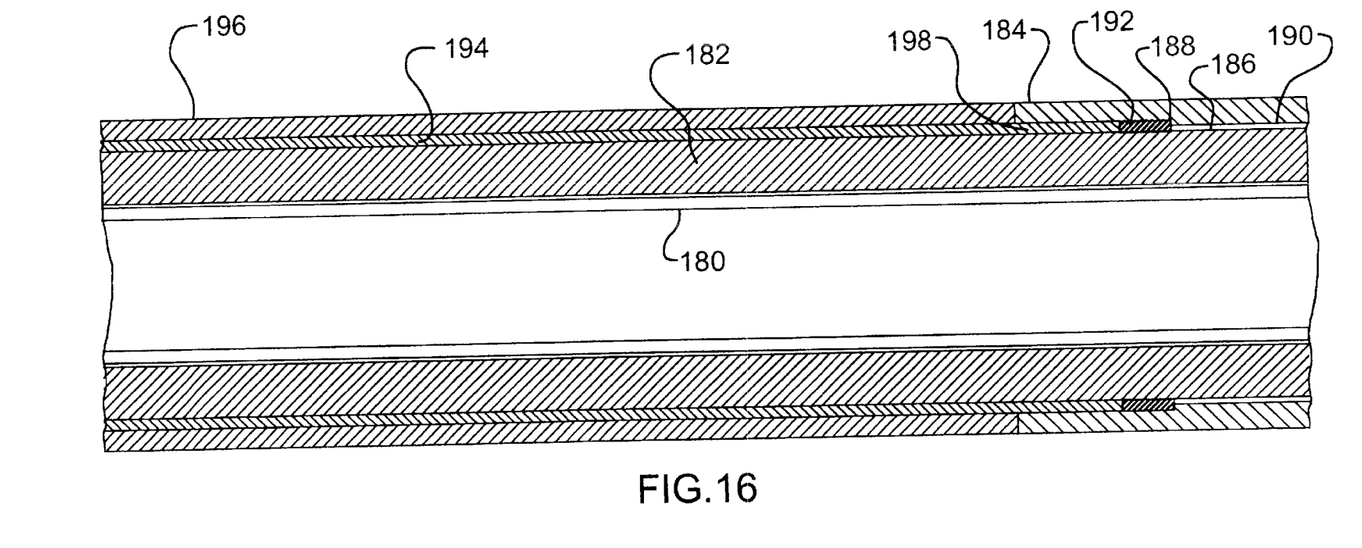
FIG. 16 is a section through an alternative embodiment of the invention having a molded rubber seal.

As previously mentioned, there are benefits in molding a rubber sleeve about the connection of the first connector to the second connector. An alternative embodiment of the invention is shown in FIG. 16 where the standard wash pipe 180 is inserted within the mandrel 182. The outer sleeve 184 is positioned over the mandrel 182 with a space 186 provided between the two components. In accordance with the other embodiments, this space is injected with an insulating material which also functions as an adhesive to bond components together but at the same time electrically insulate them. Step 188 is provided on the interior surface 190 of the sleeve to act as a stop for the plastic ring 192 of the subassembly. In accordance with this embodiment, a rubber sleeve 194 is molded onto the mandrel 182 and underneath the outer sleeve 184 up to the sealing ring 192. In accordance with standard practice, the thickness of the outer sleeve above the molded sleeve 194 is filled with the composite resin and fibre wrap 196. There are significant advantages to this design. The rubber bonds to the mandrel and the outer sleeve to form a high pressure seal in area 198 and at the same time provides electrical isolation between the components for a significant length along the mandrel beyond the outer sleeve, usually in the range of 20 to 30 inches. The significant benefit is that the outside diameter of the assembly may be greatly decreased by the thickness of the rubber in the composite coating which can equate to $3/8$ of an inch less wall thickness compared to the alternative devices of the previous figures. This is quite significant in decreasing the diameter of the sub while maintaining the structural integrity of the same. The smaller diameter sub may then be used for various types of work such as re-entry in which the existing cased wellbore is used in horizontal drilling or in directional legs of a wellbore. An additional benefit of bonding the rubber as opposed to a slip on sleeve of the other embodiments is that if there is a tear in the slip on sleeve the drilling fluid will pass through and invade the subassembly. On the other hand, with a bonded sleeve, the tear will allow fluid to contact the metal surface in that region but will not allow it to invade the rest of the subassembly.

An additional benefit to the bonded rubber sleeve is that it is securely anchored in place. The wellbore acts upon the composite coating 196 around the rubber sleeve 194 which in turn acts upon the sleeve with the torsion and axial forces. Such forces may cause a slip on sleeve to move or rotate which could lead to a sealing failure. On the other hand, the molded sleeve will resist this movement because of the bonding to the mandrel and at least to the overlap portion of the outer sleeve and regions 198.

Accordingly, a sealing membrane greatly simplifies interconnection of the components compared to the applicant's prior connectors of the aforementioned US patent applications and as well relative to the prior art. In addition to simplifying the connection, the overall wall thickness of the connector is reduced. This allows for either increased internal diameter for the wash pipe and hence, increased drilling mud flows, or increased thickness of the outer composite wrap, which is particularly advantageous in extreme drilling environments. The sealing membrane has the significant advantage, in that as pressurized fluids invade the connector, the increased pressure merely increases the effectiveness of the seal to ensure that there is no breakdown in the electrical isolation of one connector from the other and hence, signal transmission continues. The various types of interconnections for the subassemblies transfer torque and are cost effective to manufacture. Even in the event of a breakdown, the interconnection ensures that continued rotation of the subassemblies occur and that a retrieval of all of the electronics related to the transmission can be obtained.

Although preferred embodiments of the invention have been described herein in detail, it will be understood by those skilled in the art that variations may be made thereto without departing from the spirit of the invention or the scope of the appended claims

What is claimed is:

1. In a subassembly electrical isolation connector for interconnecting sections of a tubular drill rod, said subassembly having an electrically insulated connector for and between spaced-apart connector sections to transmit drilling forces therethrough, the use of a flexible sealing membrane for sealing an insulated spacing in said electrically insulated connector to prevent ingress of pressurized drilling mud into said connector and shorting out said spaced-apart sections of said connector, said flexible sealing membrane overlapping said connector sections as a sealing sleeve and having at least its sleeve ends sealed to respective portions of said connector sections to thereby energize said flexible sealing membrane, and said sealing sleeve is slid over said drill rod sections, the ends of said sleeve are secured to respective sections by clamps at each end, wherein said clamps comprise wire wraps to energize said sealing membrane an outer composite coating for protecting said flexible sealing membrane, said coating being disposed about said wire wraps and said sleeve.

2. In a subassembly of claim 1, said sealing sleeve is molded onto said connector sections after assembly of said connector is complete to thereby provide a sealing interface between said sealing sleeve and along said drill rod sections.

3. In a subassembly of claim 1, said sealing sleeve is a pre-molded sleeve.

4. In a subassembly of claim 3, said pre-molded sleeve is adhesively secured to said drill rod sections.

5. In a subassembly of claim 1, said electrically insulated connector comprising spaced-apart interfitting components provided on said spaced apart sections of said connector and electrically insulating force transmitting components provided between and determining spacing between said spaced-apart sections.

6. In a subassembly of claim 5, said interfitting components being a spline shaft on a mandrel, which is one of said sections, the mandrel is spaced apart from and opposing a spline collar on a housing, which is the other of said sections, said force transmitting components being pins embedded between said opposing splines.

7. In a subassembly of claim 5, said interfitting components being a serpentine connector of interdigitated fingers of said spaced apart sections, said torque transmitting components being buttons embedded between said opposing spaced apart fingers.

8. In a subassembly of claim 6, an electrically insulative material being injected into a space defined between said spaced apart opposing splines.

9. In a subassembly of claim 8, said insulative material being an adhesive.

* * * * *